March 30, 1943.   H. W. LANGRISH   2,314,993
TOBACCO, TEA, OR LIKE LEAF CUTTING MACHINE
Filed Nov. 9, 1940   6 Sheets-Sheet 1

Inventor
H. W. Langrish
By Watson, Cole, Grindle & Watson
Attorneys

March 30, 1943.     H. W. LANGRISH     2,314,993
TOBACCO, TEA, OR LIKE LEAF CUTTING MACHINE
Filed Nov. 9, 1940     6 Sheets-Sheet 2

March 30, 1943.    H. W. LANGRISH    2,314,993
TOBACCO, TEA, OR LIKE LEAF CUTTING MACHINE
Filed Nov. 9, 1940    6 Sheets-Sheet 3

March 30, 1943. H. W. LANGRISH 2,314,993
TOBACCO, TEA, OR LIKE LEAF CUTTING MACHINE
Filed Nov. 9, 1940 6 Sheets-Sheet 6
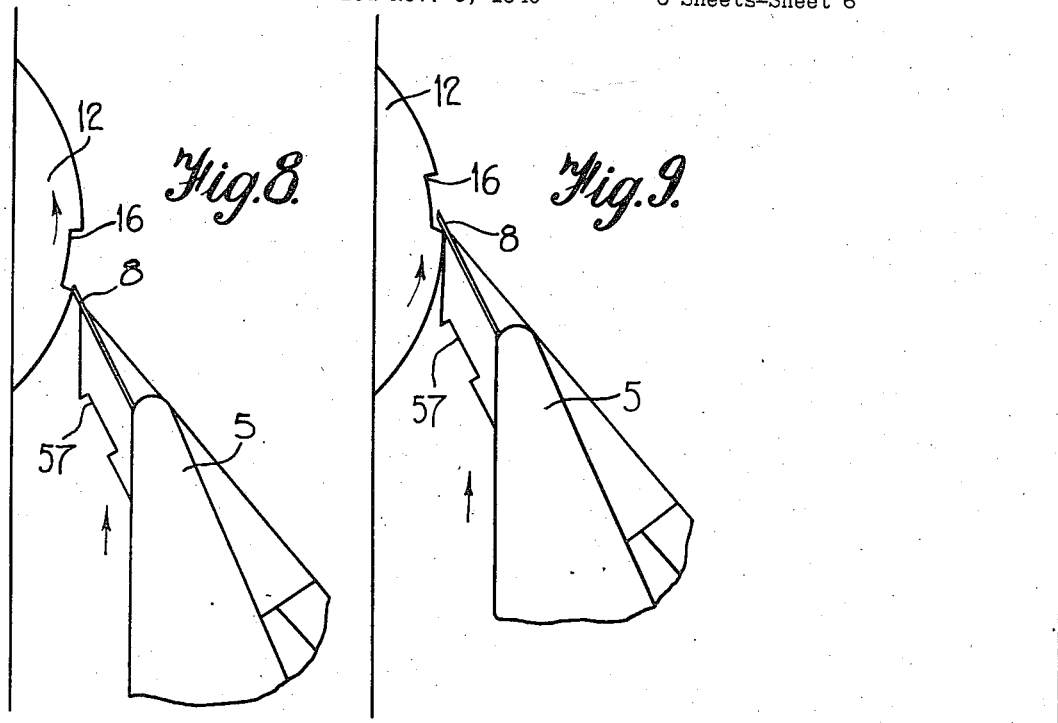
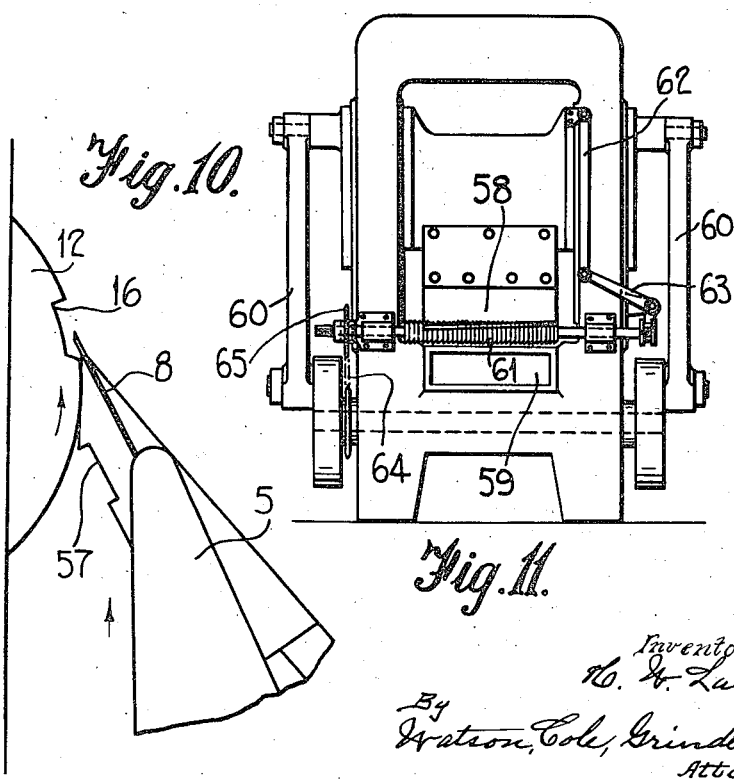

Patented Mar. 30, 1943

2,314,993

UNITED STATES PATENT OFFICE 2,314,993

TOBACCO, TEA, OR LIKE LEAF CUTTING MACHINE

Henry William Langrish, Deptford, London, England, assignor to Molins Machine Company, Limited, Deptford, London, England Application November 9, 1940, Serial No. 365,087
In Great Britain November 16, 1939

10 Claims. (Cl. 146—108)

This invention is for improvements in or relating to tobacco, tea or like leaf cutting machines. (for example as shown in British patent specification No. 426,493), and has for its object the provision of improved means whereby it is possible to ensure that the cutting knives are kept clean and free from any juice or sticky substance ensuing from the cutting operation and which may adhere thereto.

Although the present invention is applicable to all tobacco or like leaf cutting machines, it is particularly applicable to a rotary tobacco cutting machine of the type which comprises one or more knife blades mounted on a disc or disc-like member or head rotating in a plane which is generally vertical, and arranged so that the cutting edges of the knives sweep across a mouthpiece from which a "cheese" of tobacco emerges so that slices are cut off the cheese by the moving knives. The cutting edges of the knives project through the disc at an angle of say 30° so that between the cheese and the leading face of the knife there is an angle of 150°. Usually the knife edge is straight or nearly so and the disc is mounted on a spindle whose axis is the centre of rotation, but knives with curved edges have been proposed and it has also been proposed to give the head a slight planetary movement or other movement (e. g. elliptical) which is not purely rotary. Such variations from the usual construction are, however, included in the present instance in the term "machine of the type described" and insofar as the invention is applicable thereto.

It is possible to arrange straight edged knives on the head so that the cutting edges are radial, but in general this construction is inconvenient for many reasons and mainly because to make an effective machine it is necessary that the mouth should be offset with respect to the axis of rotation in order to obtain a shearing cut. In order to construct an efficient machine the blade edges are offset from the radial position as described below.

Instead of arranging the knives with their cutting edges on radii they are arranged as shown in British patent specification No. 426,493 so that the edges are tangential to a circle described about the axis of rotation. The diameter of the circle depends on several factors, such as the number of knives in the head, and the diameters of the paths swept out by their inner and outer corners which again depend on the size of the mouth, its distance from the axis of rotation and the shearing angles chosen for various positions of the knife as it sweeps across the cheese. In the case of a machine having the knives moving in a vertical plane it will be apparent that in two positions during the rotation of a knife edge will be horizontal. One of these positions is preferably chosen (as in the case of the construction shown in British patent specification No. 426,493) for the location of the knife cleaning device, for reasons connected with the driving mechanism.

It is found with machines for cutting tobacco and such like leaves that the juices and gummy and sticky substances from the leaves, and more particularly from the stems, are squeezed out by the compression of the leaves and the cutting action of the knife and adhere to the knife blade. It is customary on machines of the type described to provide grinding elements which contact with the knife blades at each revolution of the same in order to sharpen them, and when the blades are covered with juice the juice is transferred from the blades to the grinding elements, which become coated with the juices in such a manner that they do not grind the blades satisfactorily. Moreover, the blade is supported in a clamp having front and back members to enable it to be fed forwardly to compensate for wear, and the major portion of the juice accumulates in the angle between the back of the blade and the back member of the clamp.

According to the invention there is provided in or for a tobacco or other leaf cutting machine (e. g. a machine of the type described), a cleaning device comprising a rotatable member grooved transversely of its axis of rotation to provide scraping edges and engaging a moving knife in such manner that between contacting points of the moving knife and rotatable member there is a relative movement having a component transverse to the direction in which the knife edge is moving, so as to provide a scraping action across the knife.

The rotatable member may be a roller of such shape that the knife edge can touch it along the whole length of the edge, and in the case of straight edged or substantially straight edged knives the roller may be a cylinder or the frustum of a cone as described later.

In the case of non-radial knives as previously referred to in machines of the type described, the grooves in the roller are preferably circumferential (i. e. normal to the axis of the roller) but where the angle of the knife edge relative to a radius drawn from the axis of rotation requires it the grooves may be formed by one or more helical grooves cut on the surface of the roller in the manner of a screw thread. The helix angle must be such as to provide the desired scraping action. The roller is driven in timed relationship with the knife carrying head so that, for example, in the case of non-radial knives having a tapering or frusto-conical roller the peripheral speed at any point on the roller is substantially equal to the circumferential speed of the point of the knife edge contacting with said point on the roller.

The invention will be described, by way of example, with reference to the accompanying drawings in which:

Figures 8, 9 and 10 are diagrams illustrating the operation of the cleaning device.

Figure 11 shows a modification.

Figure 1:
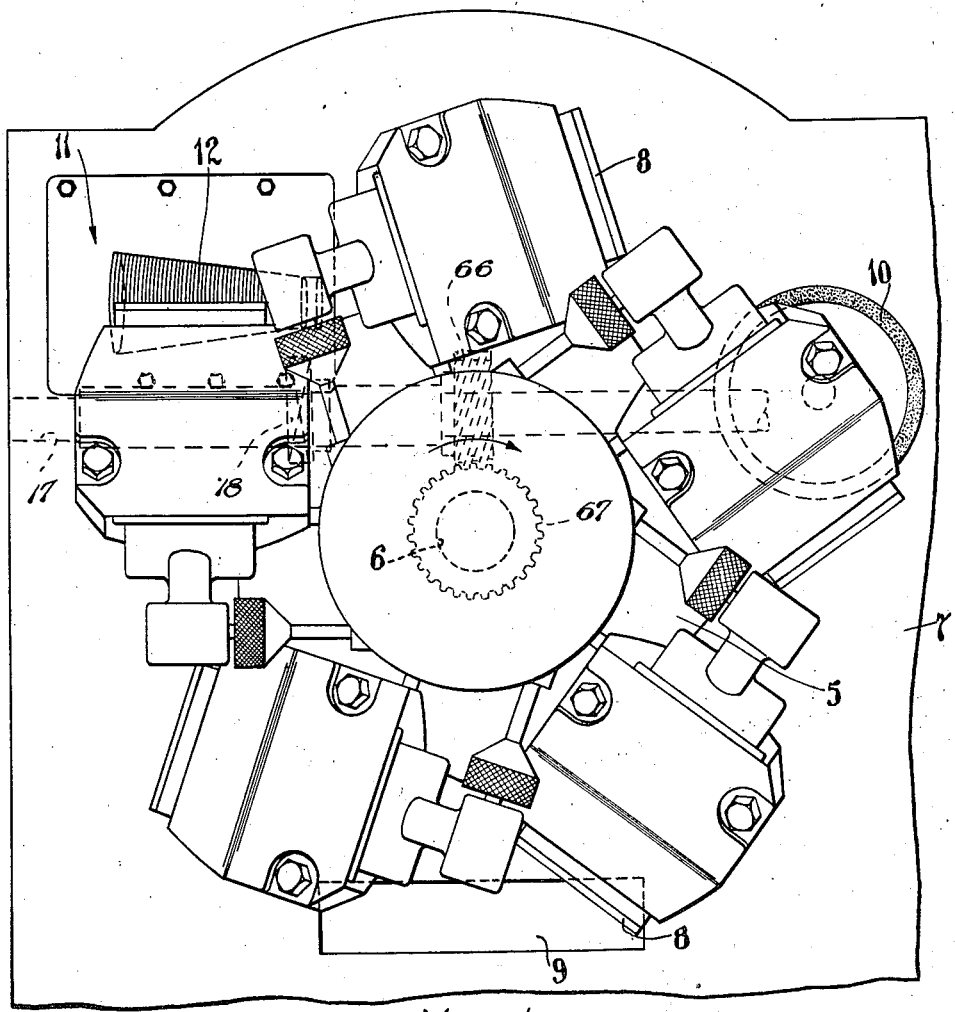
Figure 1 is a front elevation of a portion of a rotary tobacco cutting machine embodying the invention.

Referring to the drawings the knife carrying member or head 5 is fixed on a spindle 6 rotatably mounted in the frame 7 of the tobacco cutting machine and in the construction shown five knives 8 are employed and disposed at regular intervals around the knife carrier 5. The knife carrier revolves in the direction of the arrow Figure 1 and the knife edges travel in a vertical plane. The tobacco "cheese" which is to be cut issues from a mouthpiece 9 and the knives 8 move forwardly over the mouthpiece and contact therewith to effect the cutting operation. A rotatable grinding wheel 10 is provided to grind the knives during the operation of the machine and the knives pass over the surface of the grinder and are sharpened thereby before they operate to cut the "cheese" of tobacco. From Figure 1 it will be observed that each knife edge is horizontal at two positions during a revolution and at the upper or left hand position in the figure there is located a cleaning device indicated generally by the reference numeral 11 and described in detail later.

The cleaning device comprises a frusto-conical roller 12 rotating on a horizontal axis. The roller is in the form of the frustum of a cone of such dimensions that the small end moves at approximately the same speed as the inner corner of the knife while the large end moves at approximately the speed of the outer corner of the knife. That is, the peripheral speed of the large end of the roller is about equal to the circumferential speed of the outer corner of the knife. In point of fact the knife moves slightly faster than the roller in the specific embodiment being described but the relative speed depends to some extent on the shape and disposition of the knife and its clamp.

The roller is so disposed that its axis is a short distance, e. g. $\frac{7}{16}$ of an inch, see Figure 8, above the knife edge and parallel thereto when the knife edge is horizontal. As viewed from above, however, the roller axis is inclined to the plane in which the knives move and the conical surface is tangential to such plane so that the contact points lie on a right line of the frustum.

Figure 2:
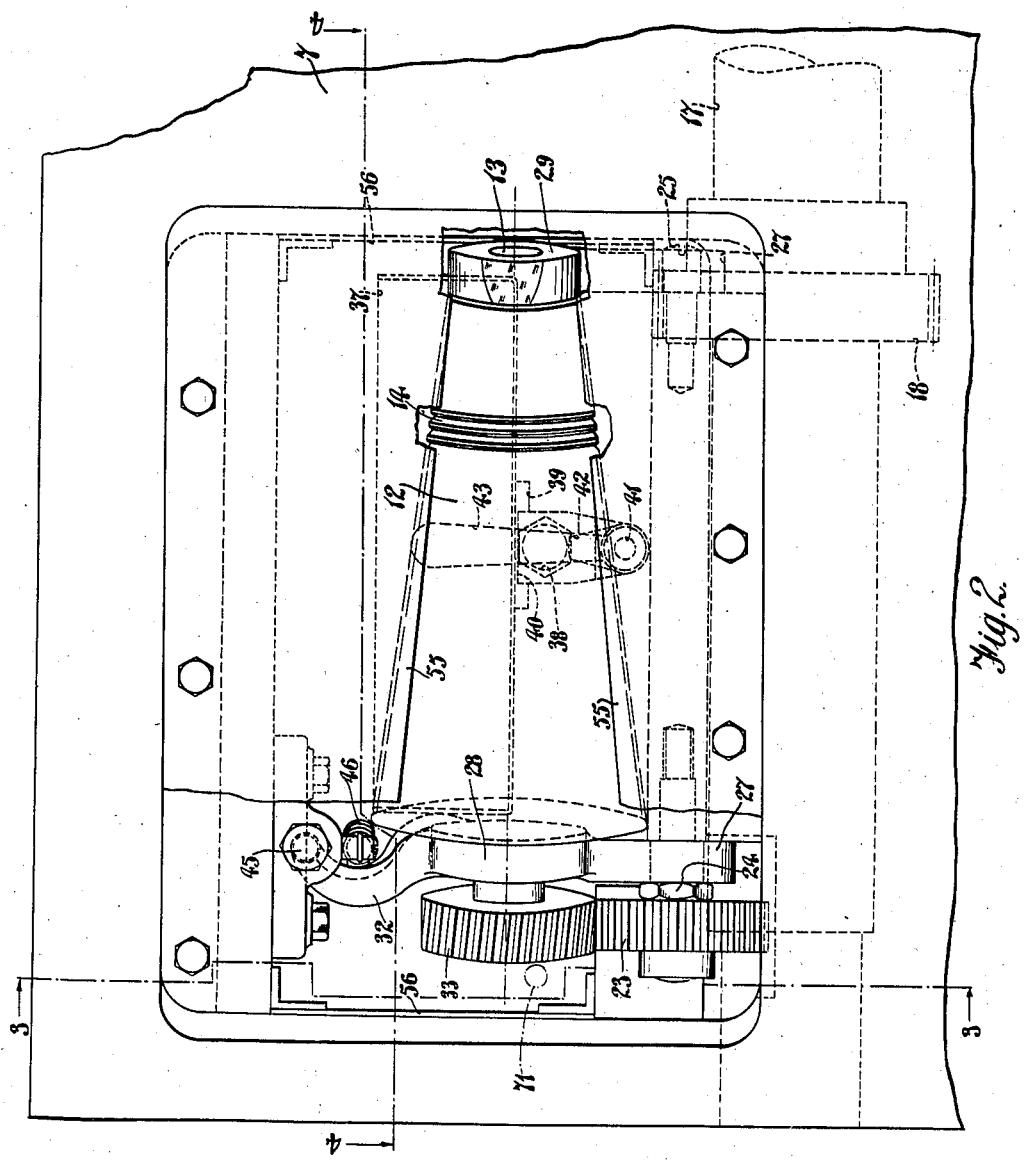
Figure 2 is a front elevation of the cleaning device shown in Figure 1, drawn to a larger scale.
Figure 3:
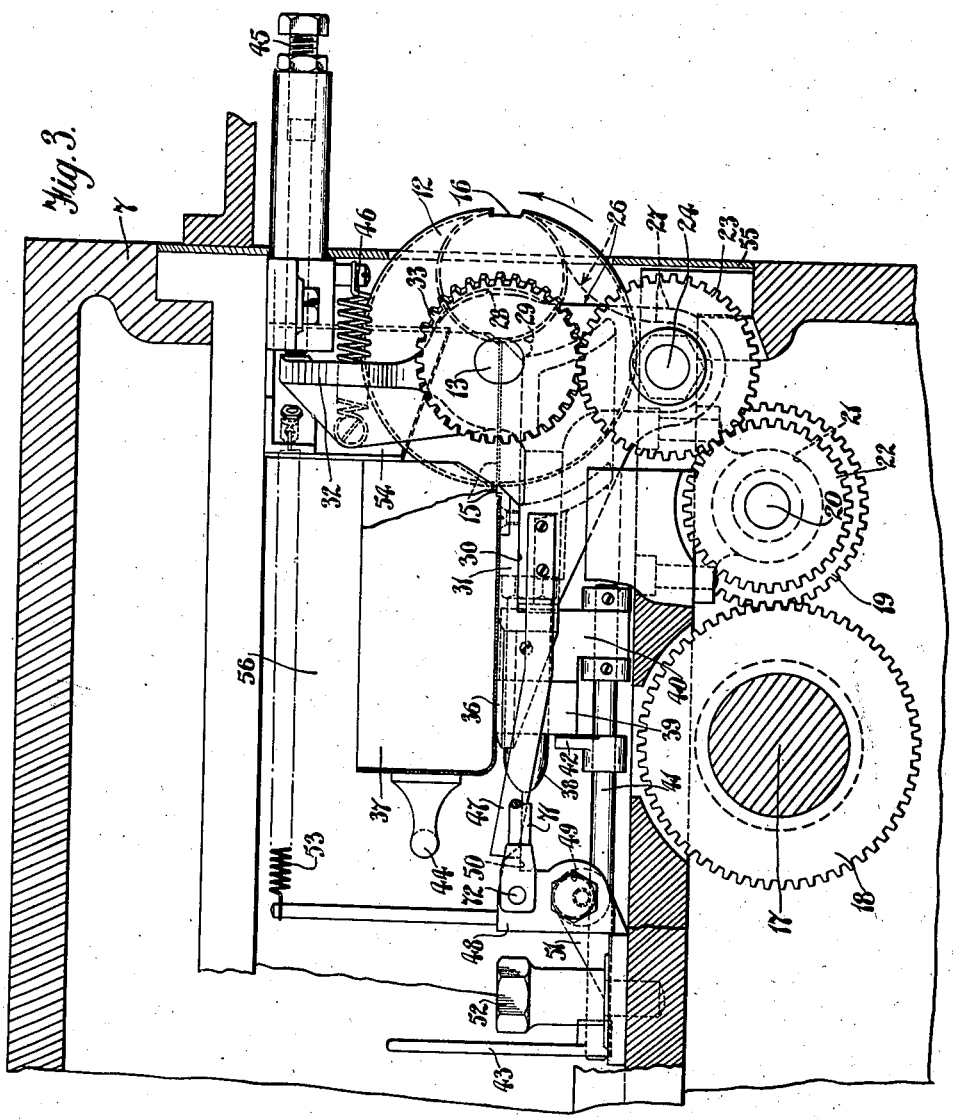
Figure 3 is a section of Figure 2 on the line 3—3 partly broken away to show hidden parts.
Figure 4:
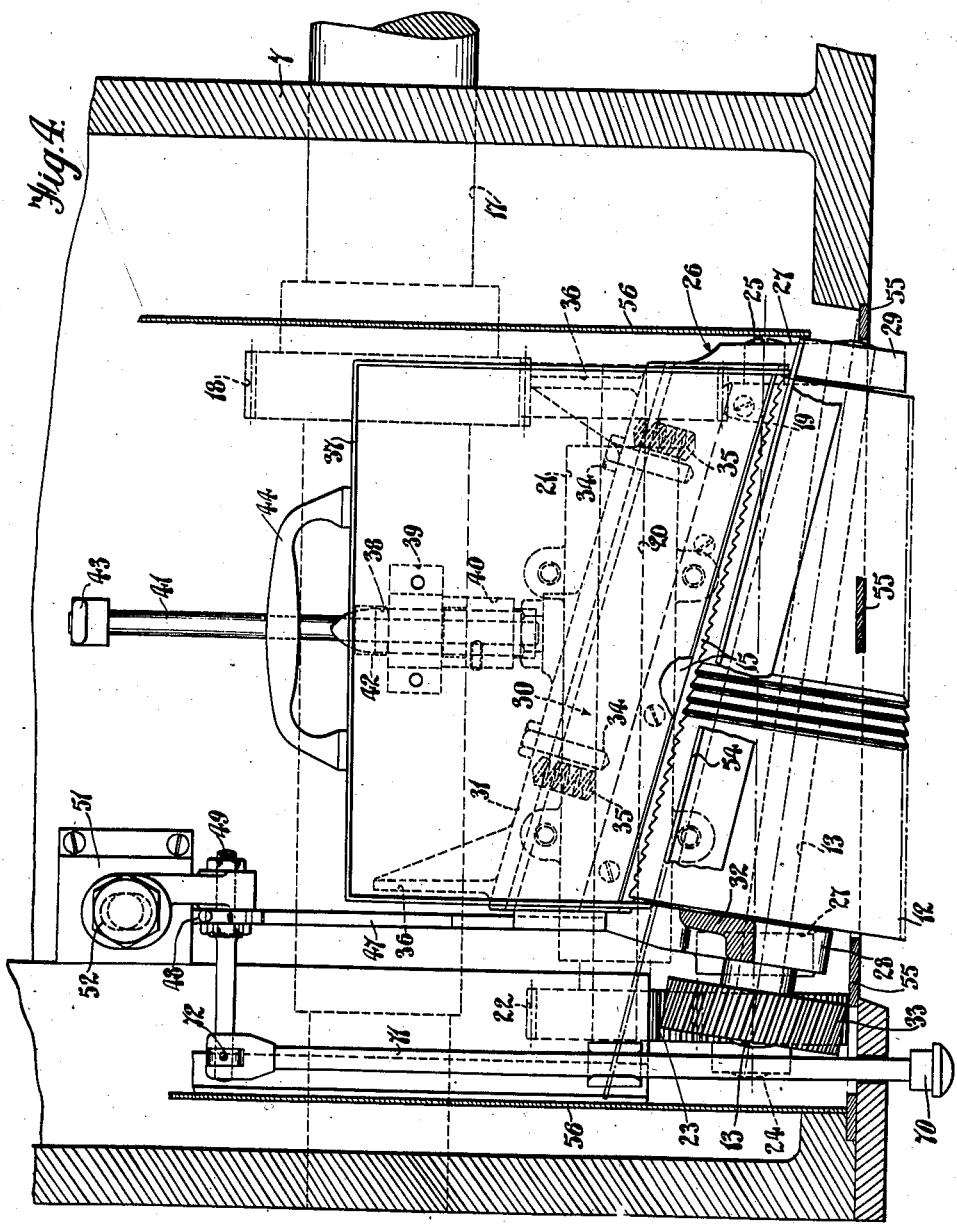
Figure 4 is a section of Figure 2 on the line 4—4.

This arrangement may be better understood by comparing Figures 2, 3 and 4 where the roller 12 is fixed on a rotatable spindle 13 mounted and rotated as described in detail below.

Figure 7:
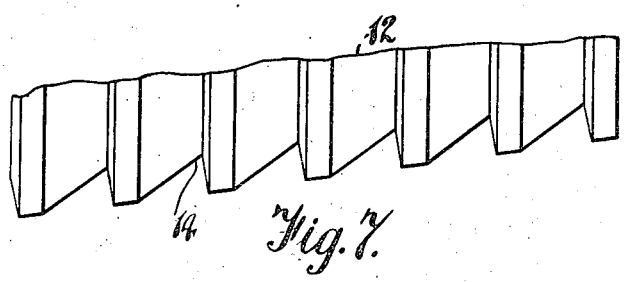
Figure 7 is a detail of the grooves in the rotatable member.

The roller has a series of equidistant circumferential annular grooves 14 on its frusto-conical surface. In section these grooves are of the same general shape as the grooves in a buttress screw thread with the vertical side directed away from the axis of rotation of the cutting head, that is, towards the base of the frustum, but a clearer idea of the shape will be gathered from Figure 7 where it will be noticed that the steeper side of the groove is normal to the face of the roller and not to the axis thereof. From the foregoing it will appear that as the knife edge reaches a substantially horizontal position and commences to engage the roller surface the grooves of the latter are rotating in vertical planes so that the instantaneous paths of any points contacting with the knife edge are vertical lines. The knife edge, however, is travelling through a curved path with its inner and outer corners describing circular arcs about the axis of rotation of the head. In consequence the instantaneous path of any point on the knife may at the moment of contact be resolved into two components, viz. a vertical component parallel to or coincident with that of the co-operating point on the roller, and a horizontal component parallel to the axis of the roller. There is thus a relative movement or translation of the knife edge with respect to the roller surface, and the substantially right angled corners of the grooves scrape the edge of the knife clean while the juices thus scraped off the knife gather in the roller grooves. A scraper 15, Figures 3 and 4, consisting of a flat toothed plate of suitable shape is fixed at the other side of the roller, that is, at a line opposite to the line of contact between knife and roller.

So far, the operation has been described in connection with the cleaning of the extreme edge of the knife, but an important object is to clean the back of the knife and the neighbouring portion of the clamp, particularly in the angle formed between the knife and the clamp where the juices tend to accumulate. To effect this cleaning, the roller is provided with a clearance groove 16 into which the extreme edge of the knife may project as engagement takes place. The groove extends from one end of the roller to the other and tapers slightly from the large end of the roller to the other.

Figure 5:
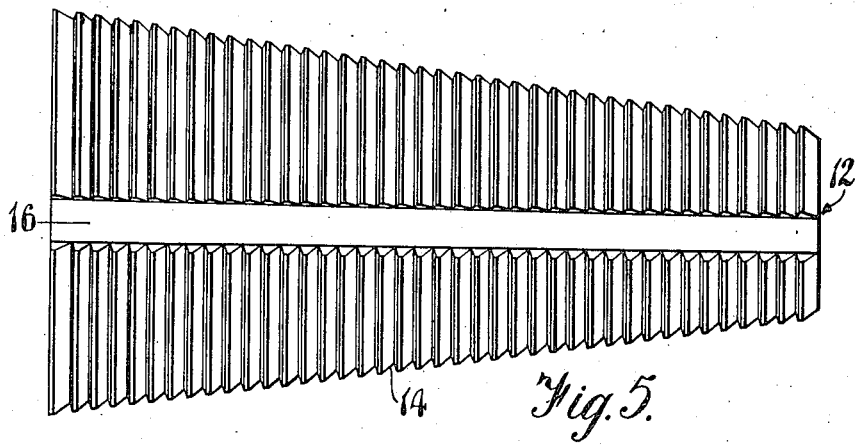
Figure 5 is a front elevation of a grooved rotatable member.
Figure 6:
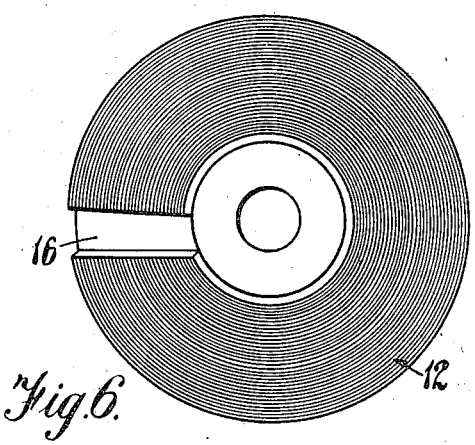
Figure 6 is an end elevation of Figure 5.

Referring to Figures 5 and 6 it will be noticed that, as drawn, the lower or operative edge of the groove is parallel to the axis, while the upper or inoperative edge lies on a radial line from the axis of the frustum, thus causing the groove to taper as noted above. This taper is merely for clearance as the knife comes into engagement with the cone but the bottom edge is purposely constructed as described to secure the desired scraping effect.

The roller is driven as hereafter described at such speed that it rotates in timed relationship with the cutter head such that each knife in turn moves into contact with the roller in the same position, i. e. in the example shown, the roller rotates five times for one revolution of the cutter head. That is, each knife edge in turn moves over the trailing side of the groove and projects into the clearance space, and continued movement of the parts cause the next part of the roller periphery to engage the back of the knife and adjoining clamp and scrape them clean in the manner previously described. See Figures 8, 9 and 10.

The general construction and driving arrangements for the cleaning device will now be described referring more particularly to Figures 2, 3 and 4. A main driving shaft 17 rotatably mounted in the frame 7 of the cutting machine has a gear wheel 18 fixed thereto. This shaft also drives the spindle 6 of the knife carrying head 5 of the machine by a worm 66 on said shaft engaging a worm wheel 67 on the spindle 6. The gear 18 engages with another gear 19 on an intermediate shaft 20 rotatably arranged in a bearing bracket 21 which is fixed to the frame 7 of the machine, see Figures 3 and 4. The other end of the shaft 20 has a further gear 22 fixed to it which engages with an idler gear 23 rotatably mounted on a stud 24 fixed to the frame 7 and referred to hereafter as the idler pivot stud. A further pivot stud 25 is also fixed to the frame 7 in axial alignment with the idler pivot stud. On these two pivots there is pivotally mounted a member, indicated generally by the reference numeral 26, which serves as a bearing bracket for spindle 13 of the frusto-conical roller 12 and a support for the grooved scraper 15. Thus the member 26 has lugs 27 embracing the two pivot studs, cheeks 28 and 29 constituting bearings for the spindle 13, a flat seating 30 for a member 31 which carries the scraper 15 and an upstanding lug 32 at one end for the purpose of adjustment as described below. The spindle 13 has a gear wheel 33 fixed to it which engages the idler gear 23 and thus the roller is driven in the desired timed relationship with the knife carrying head 5. It will be seen that, as shown, the gear 33 is a spiral or helical gear while the other gears are all straight spur gears. This is because the spindle 13 is inclined with respect to the shafts 17 and 20. The scraper 15 is adjusted into proper engagement with the roller 12 in the following manner. The scraper is fixed to the member 31 which is of angular section and slidably arranged on the flat seating 30 of the member 26. Screws 34 may be adjusted to urge the scraper towards the roller, the reverse movement being effected by springs 35 as the screws are undone. The member 31 has two projecting lugs 36 on it which form supports for a tray 37 adapted to receive the dirt and other matter scraped from the roller 12 by the scraper 15. The tray is readily removable and is held in position by a catch device. The arrangement is best seen in Figure 3. A cylindrical stud 38 fixed to the member 31 forms a further support and locating device for the tray 37 which has a block 39 fixed to it, having a hole formed therein which slides over the stud 38. Another block 40 is fixed to the stud 38 and constitutes a bearing for a spindle 41. This spindle carries a catch member 42 which normally engages the block 39 and keeps the tray in position, Figure 3. A hand lever 43 is fixed to the free end of the spindle 41 and by moving this the spindle can be turned to move the catch out of the way of block 39, whereupon the tray may be pulled out by the handle 44.

The roller is set into the correct position to cooperate with the knives by an adjusting screw 45 which bears against the lug 32 of the member 26 the roller being urged towards the knife plane by a spring 46. It will be appreciated that if a foreign body becomes lodged between the knife and the roller or if, by accident, the roller gets out of time with the rotating head, for example during dismantling of the machine for repairs, the continued striking of knives against the roller might cause damage, although the roller can swing back on the pivots against the tension of the spring 46. To avoid such damage, a safety device is incorporated whereby the first swinging movement of the roller operates a catch device which holds the roller away from the knife plane until the operator has correctly adjusted the machine. This device is shown in Figures 3 and 4 and comprises a striking finger or plate 47 fixed to the member 26 the free end of the plate being suitably shaped to engage a pivoted catch 48. An anticlockwise swing of the member 26 on its pivots as viewed in Figure 3 causes the plate 47 to rotate the catch slightly around its pivot 49 until the plate 47 catches beneath a projection 50 on the catch when the parts become locked with the member 26 in the rear position. The catch is pivoted to a bracket 51 fixed by a screw 52 to the frame 7 the pivot 49 being eccentrically adjustable for the purpose of accurately setting the parts. A spring 53 urges the catch to rotate clockwise on its pivot to cause the catch and striking plate to lock together. The parts 47 and 50 may be released from engagement by pressing on a knob 70 which is fixed to a rod 71 pivoted at 72 to the catch 48. Shields 54, 55 and 56 are provided to house the device and prevent dirt and juices from the leaf from reaching the various moving parts. In order to reduce the tendency for juices and the like to travel downwardly towards the back of the knife holder, the latter is provided with a transverse groove 57 and juices thus fall from the holder at the corner of such groove.

By employing a roller of frusto-conical form, it will be seen that the velocity of any point on the knife is substantially equal to the velocity of the contacting point on the roller.

The invention has been described above applied to a machine of the type described, that is, a machine having a rotating knife-carrier head, but it will be seen that the invention is equally applicable to a machine having a reciprocating knife. In such a case a cylindrical roller having annular scraping grooves could be mounted so as to engage the knife at the end of its stroke and at the time of engagement be moved bodily along its axis. Thus it could be provided to have a reciprocating movement.

An arrangement of this nature is shown diagrammatically in Figure 11 where a vertically reciprocating knife 58 moves over a mouthpiece 59 of the knife being operated by connecting rods 60 in the known manner. The roller 61 is reciprocated by a link 62 co-operating with a bell crank 63 which engages the roller spindle to reciprocate the roller. A chain 64 rotates the roller by means of a chain wheel 65 splined to the roller shaft and held against axial movement as shown. If it is desired to effect a quicker axial movement of the roller, for example, to move it across the knife edge while the latter is practically stationary at the reversal of the stroke, a suitable cam may be substituted for the bell crank and link shown in the figure.

What I claim as my invention and desire to secure by Letters Patent is:

1. A leaf cutting machine comprising a moving knife and a cleaning device comprising a rotatable member grooved transversely of its axis of rotation to provide scraping edges, and means supporting the rotatable member and knife in such relative positions that between consecutive knife cuts the member and the knife are engaged and the engaged portions thereof are moved relatively in a direction having a component transverse to the direction in which the knife edge is moving so as to provide a scraping action across the knife.

2. A leaf cutting machine comprising a moving knife and a cleaning device comprising an axially tapering rotatable member grooved transversely of its axis of rotation to provide scraping edges, and means supporting the rotatable member and knife in such relative positions that between consecutive knife cuts the member and the knife are engaged and the engaged portions thereof are moved relatively in a direction having a component transverse to the direction in which the knife edge is moving so as to provide a scraping action across the knife.

3. A leaf cutting machine comprising a moving knife and a cleaning device comprising an axially tapering rotatable roller having circumferential grooves to provide scraping edges, and means supporting the roller and knife in such relative positions that between consecutive knife cuts the member and the knife are engaged and the engaged portions thereof are moved relatively in a direction having a component transverse to the direction in which the knife edge is moving so as to provide a scraping action across the knife.

4. A leaf cutting machine comprising a moving knife and a cleaning device comprising an axially tapering rotatable roller having circumferential grooves to provide scraping edges, means supporting the roller and knife in such relative positions that between consecutive knife cuts the member and the knife are engaged and the engaged portions thereof are moved relatively in a direction having a component transverse to the direction in which the knife edge is moving so as to provide a scraping action across the knife, and a scraper having an edge conforming to the profile of the scraping edges arranged to remove material from the roller.

5. A leaf cutting machine comprising a moving knife mounted at an angle to a plane in which its edge moves, a cleaning device comprising a rotatable roller grooved transversely of its axis of rotation to provide scraping edges and having a clearance groove extending lengthwise of the roller and intersecting the scraping edges, and means driving said roller and knife in such timed relation that the knife edge enters the clearance groove to enable a portion of the surface of the knife adjacent the knife edge to be scraped.

6. A leaf cutting machine comprising a knife, a rotating holder supporting said knife at an angle to a plane in which its edge moves and a cleaning device comprising a rotatable axially tapered roller provided with circumferential grooves affording scraping edges and having a clearance groove extending lengthwise of the roller and intersecting the scraping edges, and means driving said roller and knife holder in such timed relation that the knife edge enters the clearance groove to enable a portion of the surface of the knife adjacent the knife edge to be scraped.

7. A leaf cutting machine comprising a knife, a rotating holder supporting said knife at an angle to a plane in which its edge moves and a cleaning device comprising a rotatable axially tapered roller provided with circumferential grooves affording scraping edges and having a clearance groove extending lengthwise of the roller and intersecting the scraping edges, means driving said roller and knife holder in such timed relation that the knife edge enters the clearance groove to enable a portion of the surface of the knife adjacent the knife edge to be scraped, and a scraper having an edge conforming to the profiles of the scraping edges arranged to remove material from the roller.

8. A leaf cutting machine comprising a moving knife mounted at an angle to a plane in which its edge moves, a cleaning device comprising a rotatable roller grooved transversely of its axis of rotation to provide ridges of the same general shape as buttress screw threads with the vertical side of the buttress directed towards the larger end of the roller, to afford scraping edges, and having a clearance groove extending lengthwise of the roller and intersecting the scraping edges, and means driving said roller and knife in such timed relation that the knife edge enters the clearance groove to enable a portion of the surface of the knife adjacent the knife edge to be scraped.

9. A leaf cutting machine comprising a moving knife and a cleaning device comprising a rotatable roller grooved transversely of its axis of rotation to provide scraping edges, and means supporting the roller and knife in such relative positions that between consecutive knife cuts the roller may be relatively reciprocated to cause the roller to engage and move over the knife in a direction having a component transverse to the direction in which the knife edge is moving so as to provide a scraping action across the knife, and means for so reciprocating said roller.

10. A leaf cutting machine comprising a knife, means supporting said knife for movement such that the knife edge describes a fixed path, and a cleaning device comprising a rotatable member grooved transversely of its axis of rotation to provide scraping edges, means resiliently supporting the rotatable member in a position such that between consecutive knife cuts the member and the knife are engaged and the engaged portions thereof are moved relatively in a direction having a component transverse to the direction in which the knife edge is moving so as to provide a scraping action across the knife, said supporting means for said member yielding in the event of fouling of the roller on the knife or interposed foreign obstacle to permit displacement of said member away from the knife, and releasable means retaining said member in the position to which it is so displaced.

HENRY WILLIAM LANGRISH.